Jan. 23, 1945. W. G. CHAMBERS 2,367,997
FILTER FOR SWIMMING POOLS
Filed July 11, 1942 3 Sheets-Sheet 1
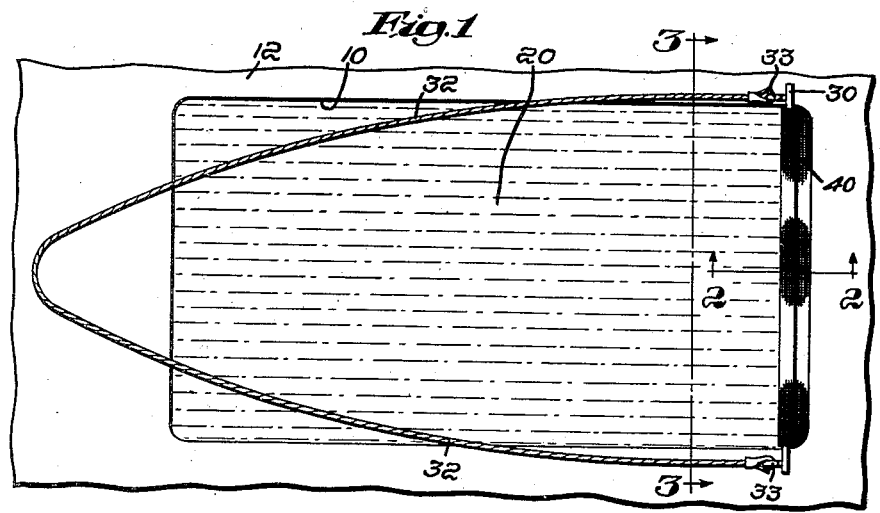
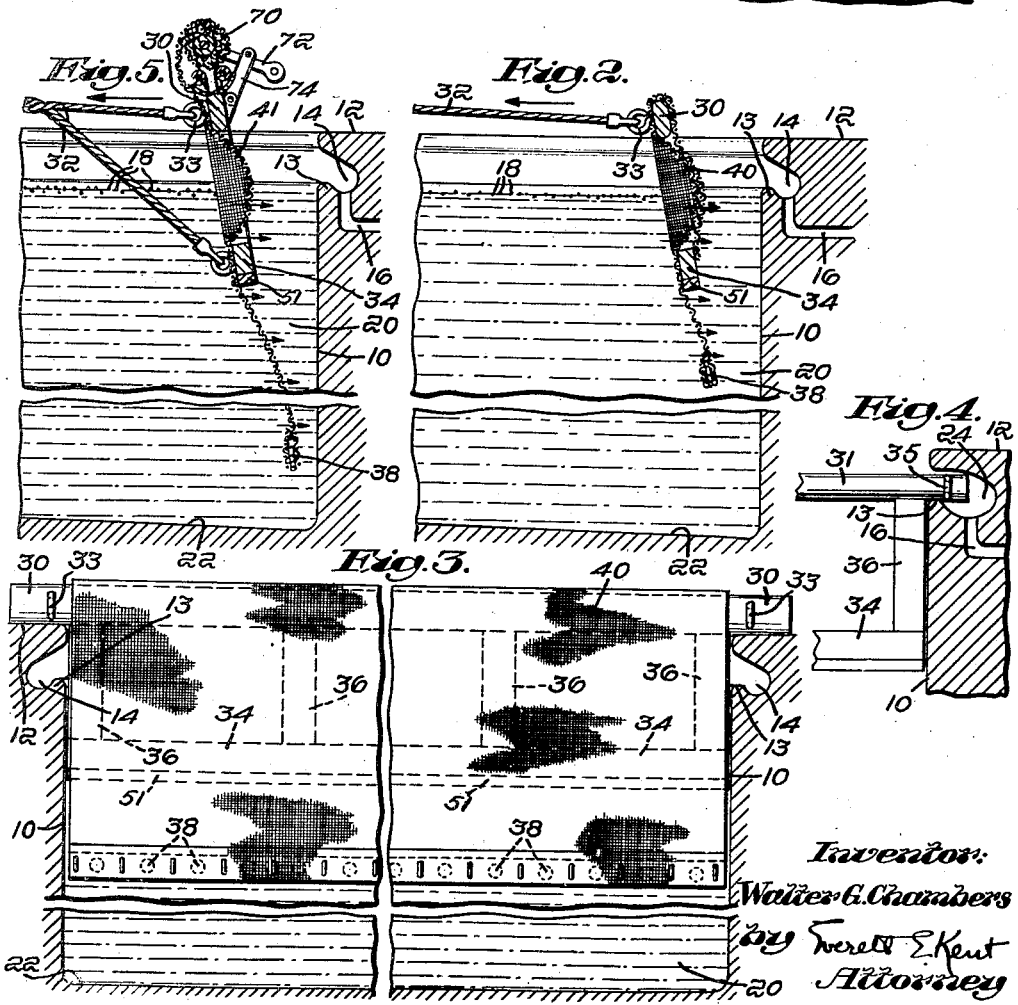
Inventor:
Walter G. Chambers
by Everett E. Kent
Attorney Jan. 23, 1945.  W. G. CHAMBERS  2,367,997
FILTER FOR SWIMMING POOLS
Filed July 11, 1942   3 Sheets-Sheet 2
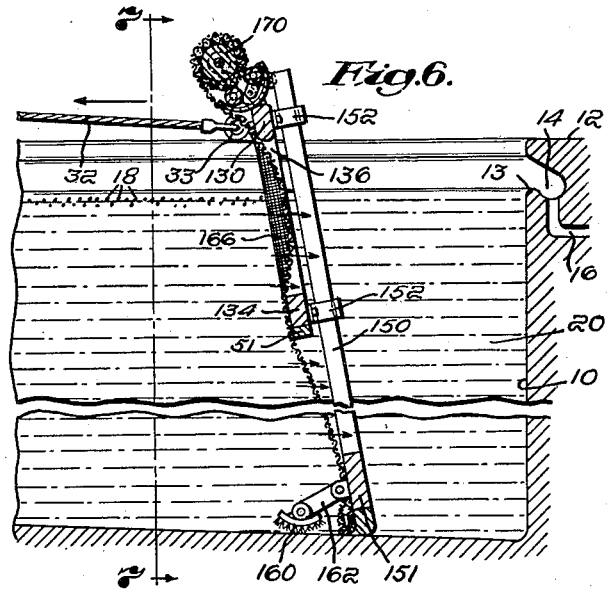
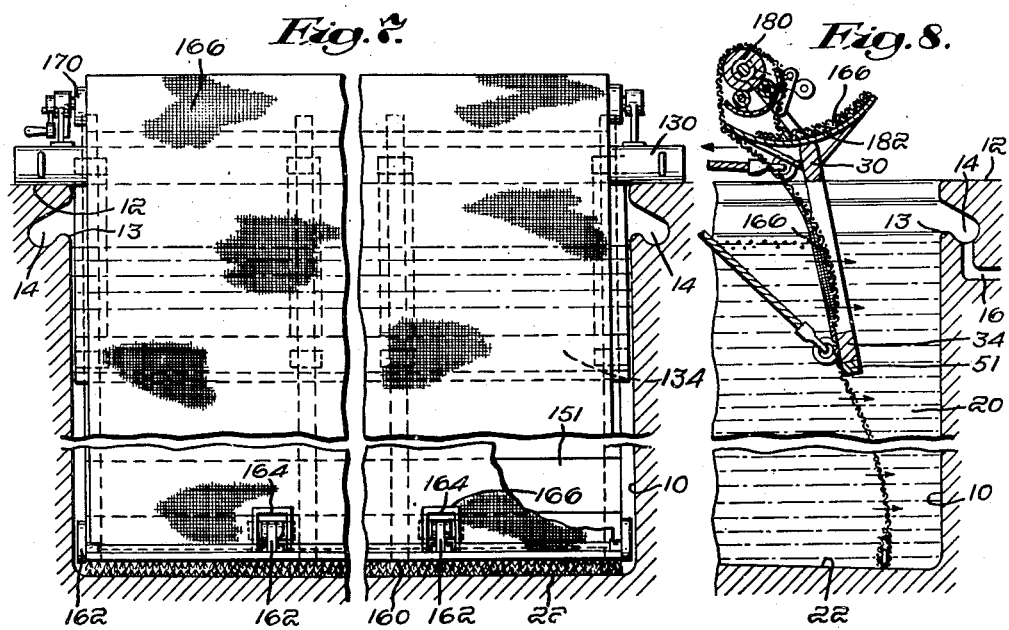

Patented Jan. 23, 1945

2,367,997

UNITED STATES PATENT OFFICE 2,367,997

FILTER FOR SWIMMING POOLS

Walter G. Chambers, Needham Heights, Mass.

Application July 11, 1942, Serial No. 450,504

2 Claims. (Cl. 210—149)

This invention relates to improvements in filters for swimming pools.

More particularly it provides a device for removing dust and dirt from the upper water of a swimming pool.

The present practice for removing contaminated surface water is to over-fill the pool, so that surface water flows off into the gutters at the edges of the pool. This takes a long time; involves a large waste of water; and is not so effective as is desirable, because some of the surface water holding dust fails to get into the gutter during the period of the over-filling.

The present invention filters the water which is at and near the surface, over the full area of the pool, removing microscopic and macroscopic solid matter which is floating there. It can be arranged for the zone of filtration to extend deeply toward the bottom of the pool. It can also be combined with means to rouse sediment from the bottom, so as to filter this out from water that is near the bottom.

It is ordinary experience that dust and other foreign bodies of various sorts in the atmosphere get caught in the surface water of indoor pools, as well as of out-door pools. Some of this settles through the water, and makes a sediment which is so considerable that in some in-door pools it is removed from the bottom daily. Sediment also forms from the chemical that are put in the water to combat bacteria. This gathers in small somewhat flocculent masses that rise easily from the bottom when distributed. One method for cleaning the bottom, commonly used, is to stir up the sediment with a brush, and to suck out water from the brush. But such appliances do not remove all the water that they roil; and they do nothing toward cleaning the top water. A bad surface region, where swimmers' heads are immersed, is even more offensive than dirt on the bottom.

It is a primary object of the invention to provide a device for quickly and conveniently filtering the water which is at and near the surface.

To attain this object the device provides a movable frame, which spans the pool, from side to side, and dips at least a few inches below the surface of the water. The frame has a horizontal rail above water and a horizontal rail below water, holding a filter cloth across the full width of the pool. By moving this frame and cloth through the whole length of the pool, all of the topmost of the water becomes flowed through this cloth. At the end of the pool the cloth can be lifted clear of the frame, and so be removed, with the foreign matter which it has gathered.

The effort to accomplish a cleaning of the surface water by merely dragging an immersed hanging cloth along the pool is ineffective. Such a cloth affords very little filtration effect because it becomes displaced and lets unfiltered water pass it. It is therefore a further particular object of the invention to provide for positioning the filter cloth suitably; and for holding it in position against the displacing draft of water through which the cloth is being moved; and so as to compel the water flow through it. A preferred way to do this, in many cases, is by making the cloth hold itself on the frame. I have found that a looping of the top marginal portion of the cloth over a horizontal rail which rides close above the surface of the water, and a wetting of the looped part of the cloth, causes adhesion of the cloth both to the rail and to itself below the rail, sufficient to resist the dislocating draft of the water which is being filtered. The vertical margins of the cloth at the sides of the pool are kept at the sides of the pool by parts of the frame that extend down close to the side walls. The bottom margin of the cloth can be held down to the desired depth, without the need of there being a frame as low as the bottom of the cloth, nor all along the bottom, by marginal weights at the bottom of the cloth.

The device can be operated by one person alone, who draws the frame broadside along the pool, standing at the remote end with a cord by which he pulls the frame-ends equally. That part of the cloth which is below water bellies backward, into the frame and below the frame, but the stiffness of those parts of the frame which are below water holds the cloth to its task of forcing water through itself as the frame moves forward. The part of the cloth which is below the frame trails at a slight inclination from the vertical; and the frame itself tilts backward as it ends, resting on the floor or in the gutter at the margin of the pool, are drawn forward. The filter thus becomes slightly oblique to the direction of its travel, while it is traveling, the degree of obliquity varying with the speed; although for convenience it may be spoken of as normally hanging upright. The obliquity of impact of particles on the filter increases the probabilities of the filter catching even the smallest of particles of foreign solids that may be on or in the water which is being swept.

If it is desired to sweep deeply, in order to catch sediment that may have been raised from the bottom, this can be done; while if the pool is shallower at one end, adaptation of the filter can be made by mounting it so that its depth of immersion in the water is controllable, as, by having its out-of-water top wound on a roller.

The device can be made to clean also the bottom of the pool, if the bottom has a tiled other hard smooth surface, horizontal or gradually sloping. For this, the cloth is made to reach to the bottom when travelling, and a brush, wiper, or other sediment-raising device is provided, to be moved along the bottom by the frame in advance of the bottom of the cloth. The sediment is thus stirred up into the water that is about to pass through the filter, and becomes caught by the cloth, and later is removed with the cloth.

Briefly the method is to catch all waters that are near the surface of the pool, or, if desired, to catch all of the waters of the pool, while they remain in the pool, and to force them horizontally through a filter having an upright filtering area.

The apparatus of the invention may be embodied in various structural forms, those shown in the drawings being illustrative merely, and not definitive.

It is intended that the patent shall cover, by suitable expression in the appended claims, whatever of patentable novelty exists in the invention disclosed.

In the accompanying drawings, which are somewhat diagrammatic:

Figure 1 is a plan showing apparatus installed in a swimming pool in position to begin operation of the invention;

Figure 2 is a side elevation of an end portion of the pool, on 2—2 of Figure 1, on a larger scale, showing the filter at the moment when its cleaning sweep has just been begun.

Figure 3 is an elevation in section on 3—3 of Figure 1 showing the face of the filternig apparatus of Figures 1 and 2 as seen from the end of the pool toward which it is to be drawn;

Figure 4 is an elevation, looking endwise of the pool, showing an end of the frame as it may be constructed to ride on the edge of the gutter, being viewed as in Figure 3;

Figure 5 is an elevation as in Figure 2 of a form in which the apparatus may be constructed, in which the filter cloth is supported from a reel by which its depth in the water can be varied;

Figure 6 is a similar elevation of another form in which the filter is combined with a bottom brush to clean the bottom and filter all the water in the pool;

Figure 7 is an elevation corresponding to Figure 3 but showing the apparatus of Figure 6; and Figure 8 is an elevation corresponding to Figure 6 of a slightly different form of deep filter.

Figure 9:
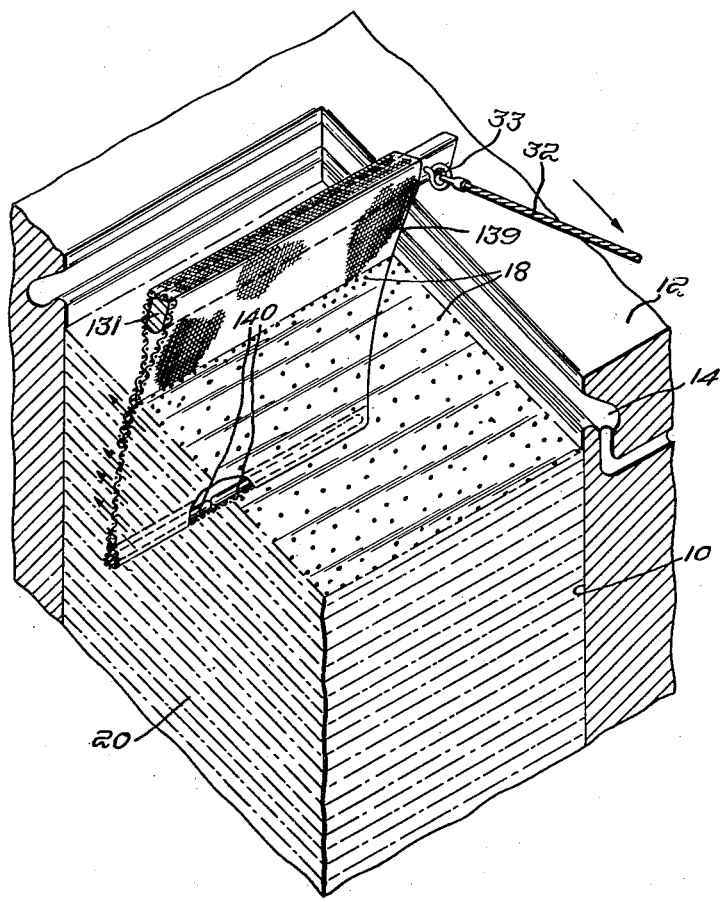
Figure 9 is a perspective, in which is portrayed in a corner section, a simplified embodiment of the invention, in which a rail made of sinker rods abutted endwise together serves to spread the filter cloth downward and across the pool.

The drawings indicate diagrammatically a swimming pool whose bank walls 10, in Figures 2 and 3, are sunk below the level of a floor 12 and in their upper part contain the usual gutter 14 from which a drain 16 takes away whatever wash or overflow enters the gutter. Water is indicated at 20 carrying, at and near the surface, dust and other foreign matter indicated by the dots having the reference numeral 18.

The bottom 22 of the pool may be as far below the top as may happen, and ordinarily is at varying depths which diminish gradually toward one end of the pool, being a sloping floor.

The purpose and effect of the invention is to clear out of the water the foreign matter represented by the dots 18 at and near the surface; but the operation of the invention can be made effective through all of the water downward from the surface to as great a depth therein as may be desired, in case it is found advisable to clear the water at depth below the surface region.

A simple and effective form of the apparatus used in thus clearing the water is seen in plan in Figure 1, comprising a horizontal rail 30 resting on the margins of the floor 12 beside the pool, over which rail is looped a filter cloth 40 and from the ends of which rail there extend stout cords 32 somewhat longer than the pool, if the work is to be done by one man alone, while only short lengths are requisite if two men are available for the work. The function of these cords is to pull the two ends of the rail simultaneously lengthwise of the pool.

The rail 30 is an upper member of a frame which has a lower horizontal member 34 secured to it by any suitable structural arrangement, herein represented as a series of uprights 36 of sufficient strength and frequency to prevent undue sag of the frame in its span from side to side of the pool. The rectangular frame of the drawings may be considered diagrammatic to indicate any sort of span that may be stiff enough to hold the rail 30 above the surface of the water, and preferably reasonably near to horizontality while carrying whatever load is imposed upon it by the remainder of the frame, and the filter sheet 40 with its attachments.

The latter sheet may be of muslin or other cotton cloth or other material through which water can pass and be strained in its passing. The horizontal top edge of this sheet, which is as long as the pool is wide, may be finished or unfinished, but is provided with some means by which it can be held by the rail 30. As illustrated in Figure 2 the means provided is simply that there is enough extension of width of this sheet so that the sheet edge can be looped over the rail 30 and extend down on the back side and overlie a part of the sheet below the rail 30. It has been found that when a sheet thus arranged is wetted it will adhere sufficiently strongly to the rail and to the part of itself which it overlies so as to hold up all the rest of the sheet which is below the surface of the water, including the weights 38 which are provided at its bottom edge. The weighting of this bottom edge may be accomplished in any convenient way, distributively across the pool, that which is indicated by the drawings being the making of a hem along the bottom edge, and separating the interior of that hem into compartments by short vertical lines of stitching, in each of which is a pellet of lead or other weight 38.

In the frame the uprights 36, and one or more submerged bars 34, are in sufficient proximity to the rail and to each other to hold the filter cloth 40 from bellying so far, backward when it is drawn through the water, as to interfere with its proper operation; or a grill work or grid may be provided for the like purpose, affording frequent stiff backing for the cloth.

The ends of the bar 30 which ride on the margin of the floor at the edge of the pool may be rounded somewhat, as seen in Figure 2, to facilitate the tipping of the rail slightly so that the frame itself can be tilted to a small angle from the vertical as the frame and submerged filter cloth meet resistance of water going through the filter. And a channel may be cut in each end part of this rail, to receive the cord by which it is to be drawn, as seen at 35 in Figure 4, or an eye-bolt may be used as at 33 in other figures.

In out-of-door pools the gutters beside the pool are commonly larger than in in-door pools, as indicated at 24 in Figure 4; and for such cases, and in other places where the structural dimensions permit, the top rail 31 can rest and travel on the entrance lip 13 of the gutter 24 as indicated in Figure 4.

Other methods of holding the filter sheet in operative position may be employed, one such being indicated in Figure 5, where the sheet 41 is looped about its horizontal roller support 70 which, as better seen at 170 in Figure 7, is carried by the pool-spanning means 30. The loop is a spiral about that support, which is a roller, by turning which as by a handle 72, the depth of the bottom edge of the filter sheet can be varied. This may be held by any suitable appliance, as a pawl or hook 74, at whatever setting may be required. If set near bottom of the pool nearly the whole volume of contained water in a pool can be filtered, the depth of setting being changed for the shallower part of the pool.

By the horizontal straining method thus described solid contaminations can be removed quickly and easily from the upper waters of a pool.

A person standing at the left end of the pool indicated in Figure 1, at the middle of the rope, and pulling equally on both parts of it, can draw the rail 30 and vertical filter 40 toward him. The filter will accumulate material from the water, and will hold it until the filter has traversed the whole length of the pool. A person can then walk along the bank at the end of the pool, lifting the filter from the rail into the gutter there, or to the floor on the bank.

As the frame and the filter sheet are vertical when they are still, and the degree of their swing from strict verticality depends only on the speed with which they are drawn, brevity and succinctness are served by speaking of the action as a moving of an approximately vertical filter sheet horizontally through the upper waters.

In this action the total volume of water in the pool is not much disturbed; but all water except that which is where the filter is, during its travel, remains approximately still. And the water where the filter is also remains approximately still, but, by the travel of the filter, undergoes relative flow—through and past the moving filter as the filter travels.

While it is convenient that the support 30 for the filter should rest on the floor or gutter rim of the bank, and no carriage for it is needed, nevertheless the method of the invention can be performed, without such a support, by two persons holding in hand, by short ropes, the pool-spanning filter rail or other filter support, and merely walking the length of the pool while holding the filter immersed.

For cleaning the floor of the pool as well as its waters, the filter-carrying frame 30, 34, 36 of Figures 2–5 may be provided with a sediment-stirring device as at 160 in Figures 6 and 7 to move along the pool's floor in front of the filter cloth 166 which the frame carries; the bottom margin of the filter being set to move on the floor while travelling the length of the pool. The frame itself need not reach below the upper waters, but it may have posts 150 that project downward to the bottom, to hold the filter cloth close against the side walls of the pool, from top to bottom. Similar downward projecting posts may be set at intervals along the frame, for frequency of support. They may hold the sediment rouser, and may also hook down the bottom edge of the filter cloth at a little distance behind the rouser. The rouser is any device adapted to move easily along the pool floor, stirring up sediment as it goes, to roil the water just above the bottom and in front of the advancing filter. A simple brush 160 is illustrated to typify this; but if more vigorous rousing is desired, the brush may be rotary, of a familiar carpet sweeper type, (not illustrated) powered by wheels running on the floor of the pool. For use in a pool with sloping bottom the posts may be mounted to slip upward or downward on the frame as the frame progresses horizontally toward a shallower or deeper part of the pool.

In this operation the stirring up of sediment makes the bottom water turbid; immediately the filter clears the turbidity; and the collected sediment becomes removed with the cloth.

Figures 6 and 7 show the invention as it may be arranged for thus cleaning the floor and filtering all of the water of the pool. A frame, whose upper and lower members 130, 134 and upright 136 correspond to the frame and uprights of Figures 2 and 3, has along its back side a series of vertical posts 150 that can slide endwise up and down through means such as loose enclosing brackets 152, that hold each post upright, but let it move freely relative to the frame. These posts hold the cloth fully out to the side walls of the pool, and are at as frequent intervals across the pool as may be advisable to hold the filter cloth and the bottom brush stiffly to their work. The bottoms of these arms may preferably carry a horizontal rail 151 to rest on the pool's floor and carry the rousing device 160 loosely linked as at 162 to the bottom board of the slidable structure 150. In the illustrative arrangement shown the filter sheet 166 is long enough to reach to the bottom of the pool; has slots 164 for the links 162 to reach through it, from the rail 151 behind it to the brush 160 in front of it; and is held down by weights as in Figures 2 and 5, or it may be hooked to the bottom rail 151. This rail is held down against flotation, as is also the lower member 34 of the frame in Figures 2 and 3, by any suitable lining or weights 51 heavy enough to sink this part of the frame. The rail is a board, broad enough to extend above the tops of the slots 164 in the filter cloth 166 so that no water can pass through those slots.

Take-up means is provided at the top for use in adjusting the submerged breadth of the filter cloth to the depth of pool floor in any part of the pool. In Figure 6 this provision is a winding roller 170 constituting a reel as in Figure 5.

Figure 8 shows for the same purpose a roller 180 to which the wet cloth adheres as it passes over and is deposited in a trough 182 behind the roller. In the apparatus there shown the frame has only short vertical extent, as in Figures 2 and 5, but the filter cloth 166 is long enough for its weighted bottom edge to make it drag on the floor of the pool.

Figure 9 shows what is probably the simplest embodiment of the invention, in that the functions of the horizontal-spreading rail 34 and the vertical spreading sinkers 38 are combined in one element 140. This is a rail extending fully across the pool, made in separate sections successively abutting together, end to end, with a hem at the bottom of the filter cloth. The hem fits the rail sections with sufficient closeness to prevent any section slipping past the end of its neighboring section. The sections may be metal rods or pieces of small pipe, heavy enough to sink the lower edge of the filter, and may have rounded ends to facilitate the swinging of each section relative to its neighbors, making flexibility of the rail as a whole for convenience in inserting and handling it. Or, if there is room enough for handling beside the pool, the rail may be one integral length of rod or pipe. The rail 140 can sink the filter cloth 139 to any depth desired, even to the floor of the pool; and, if at the floor, such a sinker rail can carry and propel a sediment rousing device, forward of the filter, for functions described above. The top rail 131 may have a light truss (not shown) if the space is so long that this is advisable for preventing excessive sag; and the filter cloth may be secured to the top rail in any suitable way.

If the sinker weights that hang close to the bank walls of the pool are heavy enough for the force of gravity to keep them close to those walls, it is not necessary that the sections of the bottom rail be in mutually abutting contact across the pool.

Variations in other particulars may be made without departing from the scope of the invention as indicated in the appended claims.

I claim as my invention:

1. Apparatus for filtering microscopic and macroscopic solids from an oblong vertical-walled swimming tank, comprising, in combination, a supporting beam having length for spanning the tank and having its ends extending beyond the opposite sides of the tank so as to rest upon and slide along the banks of the tank and positioned above the water level within the tank, a frame secured to said beam and extending downwardly therefrom into the water within said tank and having a length sufficient to span said tank, a flexible filter sheet removably supported by said frame and said beam and being of sufficient length to encompass said frame and contact the side walls of said tank, said flexible filter sheet having width extending downwardly from said beam and at least to the bottom of said frame, there being means to maintain the submerged portion of said filter sheet in a substantially vertical position, and means secured to each end portion of said beam for moving said beam along the banks of said tank from end to end of the tank.

2. Apparatus for filtering microscopic and macroscopic solids from an oblong vertical-walled swimming tank, comprising, in combination, a supporting beam having length for spanning the tank and having its ends extending beyond the opposite sides of the tank so as to rest upon and slide along the banks of the tank and positioned above the water level within the tank, a frame secured to said beam and extending downwardly therefrom into the water within said tank and having a length sufficient to span said tank, a flexible filter sheet removably supported by said frame and said beam and being of sufficient length to encompass said frame and contact the side walls of said tank, said flexible filter sheet having width extending downwardly from said beam and beyond the bottom of said frame, a weight secured to said filter sheet adjacent the lower portion thereof to maintain the lower portion of said filter sheet which extends beyond the bottom of said frame in a substantially vertical position, and elongated means secured to each end portion of said beam and to each end of the bottom portion of said frame for moving said beam along the banks of said tank from end to end of the tank so that the frame and filter sheet supported thereon move with said beam through the water in said tank in a substantially vertical position.

WALTER G. CHAMBERS.